(12) United States Patent
Shaikh

(10) Patent No.: US 9,849,434 B2
(45) Date of Patent: Dec. 26, 2017

(54) METHODS AND APPARATUS FOR ENHANCED GAS DISTRIBUTION

(75) Inventor: Ashfaq Shaikh, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 0 days.

(21) Appl. No.: 12/887,535

(22) Filed: Sep. 22, 2010

(65) Prior Publication Data

US 2012/0068111 A1 Mar. 22, 2012

(51) Int. Cl.

| B01J 8/22 | (2006.01) |
|---|---|
| B01J 4/00 | (2006.01) |
| B01J 10/00 | (2006.01) |
| B01J 8/18 | (2006.01) |
| B01J 19/18 | (2006.01) |
| B01J 19/24 | (2006.01) |

(52) U.S. Cl.
CPC ............. B01J 10/002 (2013.01); B01J 4/004 (2013.01); B01J 8/1827 (2013.01); B01J 8/22 (2013.01); B01J 19/1818 (2013.01); B01J 19/245 (2013.01); B01J 2208/00911 (2013.01)

(58) Field of Classification Search
CPC .......................... B01J 2208/00911; B01J 4/004
USPC .................................................. 422/230, 231
See application file for complete search history.

(56) References Cited

U.S. PATENT DOCUMENTS

| 689,460 | A | * | 12/1901 | Clark et al. ................... 261/143 |
| 1,157,993 | A | * | 10/1915 | McElroy ........................ 554/141 |
| 2,816,011 | A | * | 12/1957 | Trainer et al. ................. 422/144 |
| 2,980,515 | A | * | 4/1961 | Horner et al. ................. 422/211 |
| 3,785,779 | A | * | 1/1974 | Li et al. ......................... 422/231 |
| 3,911,064 | A | * | 10/1975 | McWhirter et al. ............. 261/87 |
| 4,444,653 | A | * | 4/1984 | Euzen et al. ................... 208/152 |
| 4,478,707 | A | * | 10/1984 | Bischoff et al. ............... 208/157 |
| 4,580,597 | A | * | 4/1986 | Cordingley et al. ....... 137/561 A |
| 4,655,242 | A | * | 4/1987 | Hamazaki ............... F16K 13/10 137/247.27 |
| 4,809,744 | A | * | 3/1989 | Bhat .......................... 137/561 A |
| 5,256,810 | A | * | 10/1993 | Rowe et al. ................... 558/320 |
| 6,080,372 | A | * | 6/2000 | Machado ....................... 422/604 |
| 6,110,440 | A | * | 8/2000 | Ohta et al. ..................... 423/351 |
| 6,358,483 | B1 | | 3/2002 | Trott et al. |

(Continued)

FOREIGN PATENT DOCUMENTS

| CN | 101010282 A | 8/2007 |
| CN | 101811930 A | 8/2010 |

(Continued)

OTHER PUBLICATIONS

International Search Report and Written Opinion of the International Searching Authority dated Feb. 16, 2012, in PCT/US 11/52542.

(Continued)

*Primary Examiner* — Jennifer A Leung
(74) *Attorney, Agent, or Firm* — Oblon, McClelland, Maier & Neustadt, L.L.P.

(57) ABSTRACT

Methods and apparatus for introducing a gas into the reaction zone of a reactor. Such methods and apparatus can more evenly distribute the gas throughout the reaction zone. Spargers for introducing a gas into the reaction zone of a reactor can be employed in systems and methods for carrying out the liquid-phase oxidation of an oxidizable compound, such as para-xylene.

15 Claims, 4 Drawing Sheets

(56) References Cited

U.S. PATENT DOCUMENTS

| | | | |
|---|---|---|---|
| 7,273,950 | B2 | 9/2007 | Varela-Fuentes et al. |
| 2006/0047148 | A1 | 3/2006 | Wonders et al. |
| 2007/0292319 | A1* | 12/2007 | Woodruff et al. ............ 422/188 |
| 2010/0216896 | A1 | 8/2010 | Wang et al. |
| 2010/0275611 | A1 | 11/2010 | Prabhu |

FOREIGN PATENT DOCUMENTS

| | | | |
|---|---|---|---|
| EA | 006969 B1 | 6/2006 | |
| EP | 0 099 800 A1 | 2/1984 | |
| JP | S52-65179 A | 5/1977 | |
| JP | 6-300457 A | 10/1994 | |
| JP | 06300457 A * | 10/1994 | |
| JP | H10-216501 A | 8/1998 | |
| JP | 2007-269655 A | 10/2007 | |
| JP | 2008-511656 A | 4/2008 | |
| JP | 2010-119965 A | 6/2010 | |
| KR | WO 2009107927 A1 * | 9/2009 | ............ B01J 8/006 |
| RU | 2299180 C2 | 5/2007 | |
| SU | 1125210 A | 11/1984 | |
| WO | WO 2006/028809 A2 | 3/2006 | |
| WO | WO 2006/028818 A1 | 3/2006 | |

OTHER PUBLICATIONS

Office Action dated Mar. 26, 2015 in Saudi Arabia Patent Application No. GC 2011-19360 (submitting English language translation only).

Office Action dated May 12, 2015 in Japanese Patent Application No. 2013-530258 (with English language translation).

Combined Office Action and Search Report dated May 5, 2015 in Taiwanese Patent Application No. 100134202 (with English language translation).

Office Action dated May 18, 2015 in Chinese Patent Application No. 201180056024.3 (with English language translation).

Office Action (Decision of Final Rejection) dated May 10, 2016 in Japanese Patent Application 2013-530258 filed Sep. 21, 2011.

Office Action dated Sep. 23, 2015 in Mexican Patent Application No. MX/a/2013/003046 filed Sep. 21, 2011 with partial English translation.

Official Decision dated Jun. 14, 2016 in Egyptian Patent Application No. PCT 460/2013 filed Mar. 20, 2013 with English translation.

Official Decision dated Jul. 12, 2016 in Taiwanese Patent Application No. 100134202 filed Sep. 22, 2011 with English translation.

Office Action dated Jul. 20, 2015 in Russian Patent Application No. 2013118028/05(026674) filed Sep. 21, 2011.

Third Office Action dated Feb. 5, 2016 in Chinese Patent Application No. 201180056024.3 filed Sep. 21, 2011 with English translation.

Decision on Grant dated Aug. 3, 2016 in Russian Patent Application No. 2013118028, filed Sep. 2, 2011 with English translation.

Decision of Rejection dated Sep. 1, 2016 in Chinese Patent Application No. 201180056024.3, filed May 22, 2014 with English translation.

Korean Office Action (Notice of Preliminary Rejection) dated Aug. 31, 2017 in Korean Patent Application No. 2013-7009978 with English translation.

Combined Chinese Office Action and Search Report dated Jul. 1, 2014 in Patent Application No. 201180056024.3 (with English language translation).

Office Action dated Oct. 6, 2017 in Canadian Patent Application No. 2,811,334.

Office Action (Notice of Reasons for Rejection) dated Oct. 17, 2017 in Japanese Patent Application No. 2016-176605 with English translation.

\* cited by examiner

METHODS AND APPARATUS FOR ENHANCED GAS DISTRIBUTION

BACKGROUND

1. Field of the Invention

Various embodiments of the present invention generally relate to methods and apparatus for enhancing gas distribution in a reactor. More particularly, various embodiments of the present invention relate to spargers providing improved gas distribution in bubble column reactors.

2. Description of the Related Art

Liquid-phase oxidation reactions are employed in a variety of existing commercial processes. For example, liquid-phase oxidation is currently used for the oxidation of aldehydes to acids (e.g., propionaldehyde to propionic acid), the oxidation of cyclohexane to adipic acid, and the oxidation of alkyl aromatics to alcohols, acids, or diacids. A particularly significant commercial oxidation process in the latter category (oxidation of alkyl aromatics) is the liquid-phase catalytic partial oxidation of para-xylene to terephthalic acid. Terephthalic acid is an important compound with a variety of applications. The primary use of terephthalic acid is as a feedstock in the production of polyethylene terephthalate ("PET"). PET is a well-known plastic used in great quantities around the world to make products such as bottles, fibers, and packaging.

In a typical liquid-phase oxidation process, including partial oxidation of para-xylene to terephthalic acid, a liquid-phase feed stream and a gas-phase oxidant stream are introduced into a reactor and form a multi-phase reaction medium in the reactor. The liquid-phase feed stream introduced into the reactor contains at least one oxidizable organic compound (e.g., para-xylene), while the gas-phase oxidant stream contains molecular oxygen. At least a portion of the molecular oxygen introduced into the reactor as a gas dissolves into the liquid phase of the reaction medium to provide oxygen availability for the liquid-phase reaction. If the liquid phase of the multi-phase reaction medium contains an insufficient concentration of molecular oxygen (i.e., if certain portions of the reaction medium are "oxygen-starved"), undesirable side-reactions can generate impurities and/or the intended reactions can be retarded in rate. If the liquid phase of the reaction medium contains too little of the oxidizable compound, the rate of reaction may be undesirably slow. Further, if the liquid phase of the reaction medium contains an excess concentration of the oxidizable compound, additional undesirable side-reactions can generate impurities.

Conventional liquid-phase oxidation reactors are equipped with agitation means for mixing the multi-phase reaction medium contained therein. Agitation of the reaction medium is supplied in an effort to promote dissolution of molecular oxygen into the liquid phase of the reaction medium, maintain relatively uniform concentrations of dissolved oxygen in the liquid phase of the reaction medium, and maintain relatively uniform concentrations of the oxidizable organic compound in the liquid phase of the reaction medium.

Agitation of the reaction medium undergoing liquid-phase oxidation is frequently provided by mechanical agitation means in vessels such as, for example, continuous stirred tank reactors ("CSTRs"). Although CSTRs can provide thorough mixing of the reaction medium, CSTRs have a number of drawbacks. For example, CSTRs have a relatively high capital cost due to their requirement for expensive motors, fluid-sealed bearings and drive shafts, and/or complex stirring mechanisms. Further, the rotating and/or oscillating mechanical components of conventional CSTRs require regular maintenance. The labor and shutdown time associated with such maintenance adds to the operating cost of CSTRs. However, even with regular maintenance, the mechanical agitation systems employed in CSTRs are prone to mechanical failure and may require replacement over relatively short periods of time.

Bubble column reactors provide an attractive alternative to CSTRs and other mechanically agitated oxidation reactors. Bubble column reactors provide agitation of the reaction medium without requiring expensive and unreliable mechanical equipment. Bubble column reactors typically include an elongated upright reaction zone within which the reaction medium is contained. Agitation of the reaction medium in the reaction zone is provided primarily by the natural buoyancy of gas bubbles rising through the liquid phase of the reaction medium. This natural-buoyancy agitation provided in bubble column reactors reduces capital and maintenance costs relative to mechanically agitated reactors. Further, the substantial absence of moving mechanical parts associated with bubble column reactors provides an oxidation system that is less prone to mechanical failure than mechanically agitated reactors.

When liquid-phase partial oxidation of para-xylene is carried out in a conventional oxidation reactor (CSTR or bubble column), the product withdrawn from the reactor is typically a slurry comprising crude terephthalic acid ("CTA") and a mother liquor. CTA contains relatively high levels of impurities (e.g., 4-carboxybenzaldehyde, para-toluic acid, fluorenones, and other color bodies) that render it unsuitable as a feedstock for the production of PET. Thus, the CTA produced in conventional oxidation reactors is typically subjected to a purification process that converts the CTA into purified terephthalic acid ("PTA") suitable for making PET.

Although advances have been made in the art of liquid-phase oxidation reactions, improvements are still needed.

SUMMARY

One embodiment of the present invention concerns a reactor defining a reaction zone therein. The reactor of this embodiment comprises a sparger disposed in the reaction zone for introducing fluid into the reaction zone. The sparger of this embodiment comprises at least three radially-extending fluid distribution conduits, where each fluid distribution conduit defines at least three fluid discharge openings, where the radial spacing of the fluid discharge openings associated with each of the fluid distribution conduits decreases outwardly, and where the sparger has a maximum diameter that is at least 90 percent of the diameter of the reaction zone at the elevation where the sparger is disposed.

Another embodiment of the present invention concerns a reactor defining a reaction zone therein. The reactor of this embodiment comprises a sparger disposed in the reaction zone for introducing fluid into the reaction zone, where the sparger comprises one or more fluid distribution conduits defining in the range of from 20 to 300 fluid discharge openings, where when the sparger is theoretically partitioned into four annular regions of equal area, the cumulative discharge opening area of the fluid discharge openings located in one of the annular regions is within 25 percent of the cumulative discharge opening area of the fluid discharge openings located in at least one other of the annular regions, where the sparger has a total flow-through open area of at least 25 percent, where the fluid discharge openings have an average mean diameter in the range of from about 0.5 to about 2.0 mm, where greater than 50 percent of the fluid discharge openings are positioned to discharge the fluid in a normally downward direction, where the sparger has a maximum diameter in the range of from about 0.5 to about 6 meters, and where the sparger has a maximum diameter that is at least 90 percent of the diameter of the reaction zone at the elevation where the sparger is disposed.

Yet another embodiment of the present invention concerns a system for at least partially oxidizing an oxidizable compound by contacting at least a portion of the oxidizable compound with a gas-phase oxidant. The system of this embodiment comprises a first oxidation reactor; a second oxidation reactor in downstream fluid-flow communication with the first oxidation reactor; a bubble column reactor in downstream fluid-flow communication with the second oxidation reactor and defining a reaction zone; and a sparger disposed within the reaction zone and configured to discharge at least a portion of the gas-phase oxidant into the reaction zone. In this embodiment, the sparger comprises one or more fluid distribution conduits defining a plurality of fluid discharge openings. Also, when the sparger is theoretically partitioned into four annular regions of equal area, the cumulative discharge opening area of the fluid discharge openings located in one of the annular regions is within 25 percent of the cumulative discharge opening area of the fluid discharge openings located in at least one other of the annular regions. Further, the sparger has a total flow-through open area of at least 25 percent and has a maximum diameter that is at least 90 percent of the diameter of the reaction zone at the elevation where the sparger is disposed.

Still another embodiment of the present invention concerns a method for producing a dicarboxylic acid. The method of this embodiment comprises (a) contacting an oxidizable compound with a first gas-phase oxidant thereby forming a crude dicarboxylic acid slurry; (b) purifying at least a portion of the crude dicarboxylic acid slurry thereby forming a purified dicarboxylic acid slurry; and (c) contacting at least a portion of the purified dicarboxylic acid slurry with a second gas-phase oxidant in a reaction zone of a bubble column reactor, wherein at least a portion of the second gas-phase oxidant is introduced into the reaction zone via a sparger disposed in the reaction zone. The sparger of this embodiment comprises one or more fluid distribution conduits defining a plurality of fluid discharge openings, where when the sparger is theoretically partitioned into four annular regions of equal area, the cumulative discharge opening area of the fluid discharge openings located in one of the annular regions is within 25 percent of the cumulative discharge opening area of the fluid discharge openings located in at least one other of the annular regions, where the sparger has a total flow-through open area of at least 25 percent, where the sparger has a maximum diameter that is at least 90 percent of the diameter of the reaction zone at the elevation where the sparger is disposed.

BRIEF DESCRIPTION OF THE FIGURES

Embodiments of the present invention are described herein with reference to the following drawing figures, wherein.

DETAILED DESCRIPTION

Various embodiments of the invention concern a sparger for introducing a fluid into the reaction zone of a reactor, such as a bubble column reactor. Such a sparger can be employed in a system for the liquid-phase oxidation of an oxidizable compound, which can be carried out in the liquid phase of a multi-phase reaction medium contained in one or more agitated reactors. Suitable agitated reactors include, for example, bubble-agitated reactors (e.g., bubble column reactors), mechanically agitated reactors (e.g., continuous stirred tank reactors), and flow agitated reactors (e.g., jet reactors).

Figure 1:
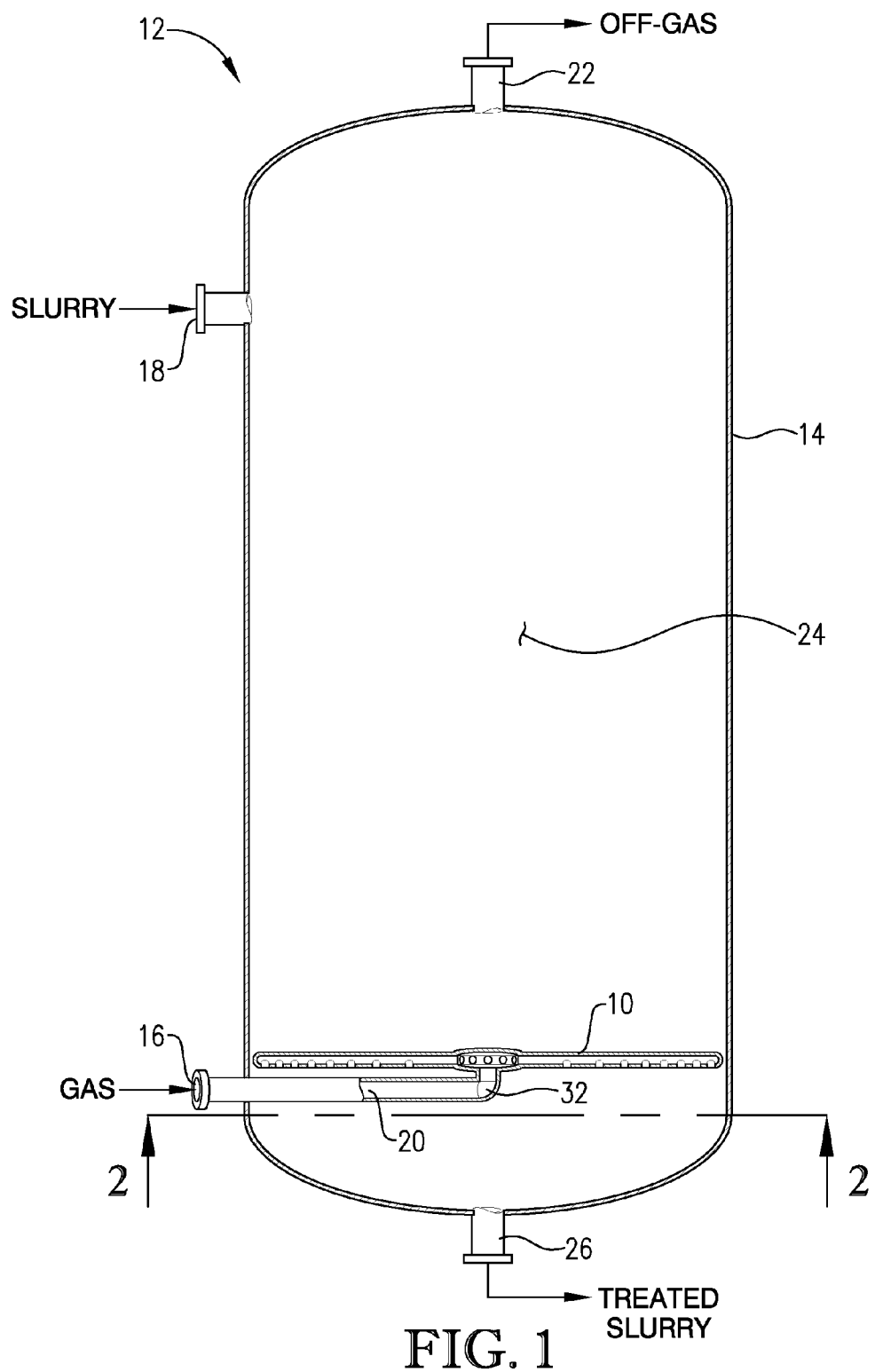
FIG. 1 is a side view of a reactor constructed in accordance with one embodiment of the present invention, particularly illustrating the introduction of slurry and gas streams into the reaction zone of the reactor, and the withdrawal of an off-gas and a treated slurry from the top and bottom of the reactor, respectively.

Referring initially to FIG. 1, a sparger 10 is shown disposed in a bubble column reactor 12. As used herein, the term "bubble column reactor" shall denote a reactor for facilitating chemical reactions in a multi-phase reaction medium, where agitation of the reaction medium is provided primarily by the upward movement of gas bubbles through the reaction medium. As used herein, the term "agitation" shall denote work dissipated into the reaction medium causing fluid flow and/or mixing. As used herein, the terms "majority," "primarily," and "predominately" shall mean more than 50 percent. As used herein, the term "mechanical agitation" shall denote agitation of the reaction medium caused by physical movement of a rigid or flexible element(s) against or within the reaction medium. For example, mechanical agitation can be provided by rotation, oscillation, and/or vibration of internal stirrers, paddles, vibrators, or acoustical diaphragms located in the reaction medium. As used herein, the term "flow agitation" shall denote agitation of the reaction medium caused by high velocity injection and/or recirculation of one or more fluids in the reaction medium. For example, flow agitation can be provided by nozzles, ejectors, and/or eductors. In various embodiments of the present invention, less than about 40, less than about 20, or less than 5 percent of the agitation of the reaction medium in the bubble column reactor is provided by mechanical and/or flow agitation.

Referring still to FIG. 1, the bubble column reactor 12 is illustrated as comprising the sparger 10, a vessel shell 14, a gas inlet 16, a slurry inlet 18, a gas entry conduit 20, and an off-gas outlet 22. The bubble column reactor 12 can be configured for a counter-current reaction scheme, such that, in operation, a slurry can be introduced via the slurry inlet 18 at or near the normally upper-portion of the bubble column reactor 12 and can flow in a downward direction through a reaction zone 24 defined in the bubble column reactor 12. A gas (e.g., a gas-phase oxidant) can be introduced into the bubble column reactor 12 via the inlet 16 and be dispersed into the reaction zone 24 via the sparger 10 located at or near the normally lower-portion of the bubble column reactor 12. The gas can then travel in a substantially upward manner through the reaction zone 24. Thereafter, a treated slurry can be withdrawn from the bottom of the bubble column reactor 12 via a slurry outlet 26. In various embodiments, the flow behavior in the reaction zone 24 can be bubbly flow or substantially bubbly flow. Furthermore, in various embodiments, the flow behavior in the reaction zone 24 can be plug flow or substantially plug flow, where there is negligible convective mixing of mass with surrounding mass while flowing through the reaction zone 24. In various embodiments, plug flow or near plug flow patterns can be achieved by increasing gas distribution in the reaction zone 24, such that the same amount or substantially the same amount of gas phase oxidant is introduced into each area of the reaction zone 24. In other words, plug flow or near plug flow behavior can be achieved by employing even or substantially even gas distribution across the entire or substantially the entire horizontal cross-section of the reaction zone 24.

Figure 2:
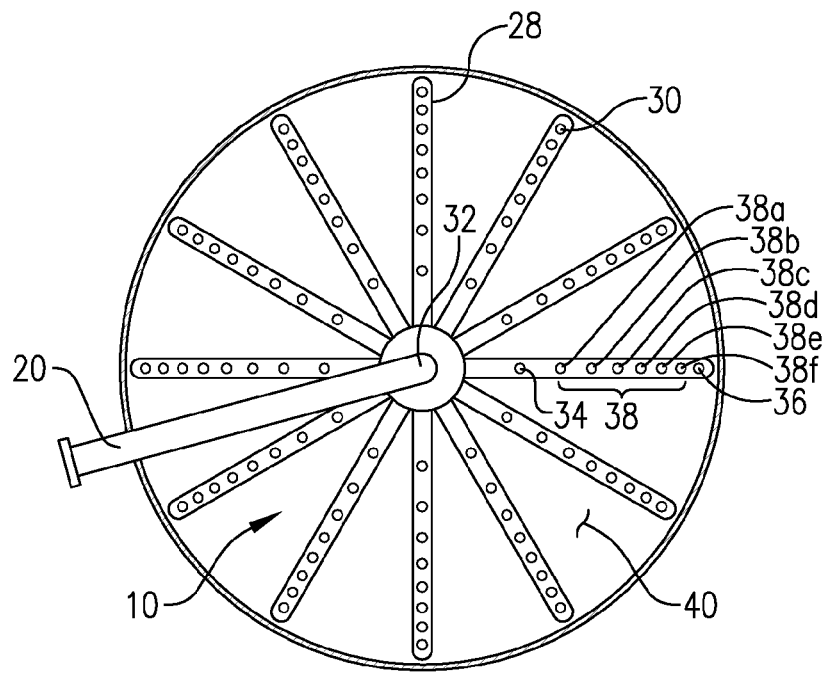
FIG. 2 is a cross-sectional view of the reactor depicted in FIG. 1 taken along line 2-2, particularly illustrating a sparger having straight radially-extending fluid distribution conduits for introducing a fluid into the reaction zone of the reactor.

Referring now to FIG. 2, a cross-section of the bubble column reactor 12 taken along line 2-2 is provided depicting the sparger 10 in greater detail. The sparger 10 comprises twelve straight or substantially straight radially-extending fluid discharge conduits 28, each comprising eight fluid discharge openings 30. Although the sparger 10 is depicted having twelve of the radially-extending fluid discharge conduits 28, in various embodiments of the invention, the sparger 10 can have at least 3, at least 4, at least 6, at least 8, or at least 10 of the radially-extending fluid discharge conduits 28. Additionally, in one or more embodiments, the sparger 10 can have in the range of from 3 to 20, in the range of from 6 to 18, or in the range of from 9 to 15 of the radially-extending fluid discharge conduits 28.

As depicted in FIG. 2, each of the radially-extending fluid distribution conduits 28 is coupled in fluid-flow communication with a vertical member 32 of the gas entry conduit 20 and extends radially therefrom. In one or more embodiments, each of the radially-extending fluid distribution conduits 28 can be equally or substantially equally spaced around the vertical member 32. As used herein, the term "substantially equally spaced" shall mean that the spacing between each of the radially-extending fluid distribution conduits 28 varies by less than 5 percent. In various embodiments, each of radially-extending fluid distribution conduits 28 can be cylindrical or substantially cylindrical. Additionally, each of the radially-extending fluid distribution conduits 28 can have a length in the range of from about 0.25 to about 3 meters, or in the range of from 0.5 to 2.5 meters. Furthermore, each of the radially-extending fluid distribution conduits 28 can have an outer diameter in the range of from about 1 to about 10 cm, or in the range of from about 2 to about 5 cm. In various embodiments, each of the radially-extending fluid distribution conduits 28 can have an outer diameter of about 3 cm.

As noted above, each of the radially-extending fluid distribution conduits 28 defines a plurality of the fluid discharge openings 30. In various embodiments, each radially-extending fluid distribution conduit 28 can comprise at least 3, at least 4, at least 6, or at least 8 of the fluid discharge openings 30. Additionally, each of the radially-extending fluid distribution conduits 28 can comprise in the range of from 3 to 20, in the range of from 5 to 17, or in the range of from 7 to 14 of the fluid discharge openings 30. In various embodiments, each of the radially-extending fluid distribution conduits 28 can comprise 8 fluid discharge openings. In various embodiments, the sparger 10 can comprise a total of at least 20, at least 50, or at least 90 of the fluid discharge openings 30. Furthermore, the sparger 10 can comprise a total number of fluid discharge openings 30 in the range of from 20 to 300, in the range of from 50 to 250, or in the range of from 80 to 220.

In one or more embodiments, the radial spacing of the fluid discharge openings 30 associated with each of their respective radially-extending fluid distribution conduits 28 can decrease outwardly from the axial center of the sparger 10. The radial spacing is considered to "decrease" in the arrangement where, if the distances between adjacent pairs of fluid discharge openings 30 (Y values) were plotted as a function of each distance's location relative to the center of the sparger (X values), the resulting linear trend line (i.e., the linear regression) would have a negative slope. What is meant by the distance's relative location is that the distance between the innermost adjacent pair of fluid discharge openings would be assigned an arbitrary X value of 1, the distance between the next outwardly spaced pair of fluid discharge openings would be assigned an arbitrary X value of 2, and so on. In various embodiments, the radial spacing can decrease between each subsequent outwardly-spaced pair of fluid discharge openings 30. However, while it is permissible, it is not necessary for the radial spacing to decrease between each subsequent outwardly-spaced pair of fluid discharge openings 30, so long as the plot described above has an overall negatively-sloped linear regression. By way of example, a fluid distribution conduit having the fluid discharge opening spacing described by the hypothetical data in Table 1 would have a slope of −5, even though the distances of space designations 2 and 6 are larger than their preceding space designations:

TABLE 1

Hypothetical Example of Decreasing Radial Spacing

| Space Designation | Distance Between Adjacent Openings |
|---|---|
| 1 | 35 cm |
| 2 | 40 cm |
| 3 | 25 cm |
| 4 | 20 cm |
| 5 | 15 cm |
| 6 | 20 cm |
| 7 | 5 cm |

In one or more embodiments, each of the radially-extending fluid distribution conduits 28 can comprise an innermost fluid discharge opening 34, an outermost fluid discharge opening 36, and one or more intermediate fluid discharge openings 38. As can be seen in FIG. 2, the distance between the innermost fluid discharge opening 34 and its adjacent intermediate fluid discharge opening 38a can be greater than the distance between the outermost fluid discharge opening 36 and its adjacent intermediate fluid discharge opening 38f. In various embodiments, the distance between the innermost fluid discharge opening 34 and its adjacent fluid discharge opening 38a can be at least 1, at least 5, or at least 10 percent greater than the distance between the outermost fluid discharge opening 36 and its adjacent intermediate fluid discharge opening 38f. Additionally, in various embodiments, the distance between the innermost fluid discharge opening 34 and its adjacent intermediate fluid discharge opening 38a can be greater than the distance between two adjacent intermediate fluid discharge openings 38 (e.g., fluid discharge openings 38a and 38b). In one or more embodiments, the distance between the innermost fluid discharge opening 34 and its adjacent intermediate fluid discharge opening 38a can be at least 1, at least 5, or at least 10 percent greater than the distance between two adjacent intermediate fluid discharge openings 38 (e.g., fluid discharge openings 38a and 38b). Furthermore, in various embodiments, the distance between the innermost fluid discharge opening 34 and its adjacent intermediate fluid discharge opening 38a can be greater than each of the distances between adjacent fluid discharge openings 38. Also, the distance between the innermost fluid discharge opening 34 and its adjacent intermediate fluid discharge opening 38a can be at least 1, at least 5, or at least 10 percent greater than each of the distances between adjacent fluid discharge openings 38. Moreover, in various embodiments, the distance between adjacent intermediate fluid discharge openings 38 can decrease with outward radial placement from vertical member 32. In one or more embodiments, the distance between adjacent intermediate fluid discharge openings 38 can decrease by at least 1, at least 5, or at least 10 percent among each subsequent outwardly placed adjacent pairs of intermediate fluid discharge openings 38. For example, the distance between intermediate fluid discharge openings 38b and 38c can be at least 1, at least 5, or at least 10 percent less than the distance between intermediate fluid discharge openings 38a and 38b. In all embodiments described herein relating to the spacing of the fluid discharge openings 30, the distance between fluid discharge openings 30 shall be determined from the center of one fluid discharge opening to the center of its adjacent fluid discharge opening.

In one or more embodiments, fluid discharge openings 30 can be spaced equiannularly or substantially equiannularly on each of fluid distribution conduits 28. As used herein, the term "equiannular" when used to describe fluid discharge opening spacing shall denote spacing such that the annular areas of theoretical concentric or substantially concentric rings defined by the centers of fluid discharge openings 30 are equal. As used herein, the term "substantially" when modifying the term "equiannular" shall mean that the annular areas of the theoretical concentric rings vary by less than 1 percent between any two annular areas.

In one or more embodiments, when the sparger 10 is theoretically partitioned into four annular regions of equal area, the cumulative discharge opening area of all the fluid discharge openings 30 located in a first selected annular region can be within 25, within 10, within 5, or within 1 percent of the cumulative discharge opening area(s) of the fluid discharge openings 30 located in at least one, at least two, or all three of the remaining annular regions. In other words, at least two, at least three, or all four of the annular regions can have cumulative discharge opening areas of the fluid discharge openings 30 that are within 25, within 10, within 5, or within 1 percent of each other. Additionally, when the sparger 10 is theoretically partitioned into four annular regions of equal area, the cumulative discharge opening area of all the fluid discharge openings 30 located in the outermost annular region can be within 25, within 10, within 5, or within 1 percent of the cumulative discharge opening area of all the fluid discharge openings 30 located in the innermost annular region. Furthermore, when the sparger 10 is theoretically partitioned into four annular regions of equal area, the cumulative discharge opening area of all the fluid discharge openings 30 located in the outermost annular region can be within 25, within 10, within 5, or within 1 percent of the cumulative discharge opening area of all the fluid discharge openings 30 located in the inner-intermediate annular region. Also, when the sparger 10 is theoretically partitioned into four annular regions of equal area, the cumulative discharge opening area of all the fluid discharge openings 30 located in the outermost annular region can be within 25, within 10, within 5, or within 1 percent of the cumulative discharge opening area of all the fluid discharge openings 30 located in the outer-intermediate annular region. Moreover, when the sparger 10 is theoretically partitioned into four annular regions of equal area, the cumulative discharge opening area of all the fluid discharge openings 30 located in the innermost annular region can be within 25, within 10, within 5, or within 1 percent of the cumulative discharge opening area of all the fluid discharge openings 30 located in the inner-intermediate annular region. Additionally, when the sparger 10 is theoretically partitioned into four annular regions of equal area, the cumulative discharge opening area of all the fluid discharge openings 30 located in the innermost annular region can be within 25, within 10, within 5, or within 1 percent of the cumulative discharge opening area of all the fluid discharge openings 30 located in the outer-intermediate annular region. Also, when the sparger 10 is theoretically partitioned into four annular regions of equal area, the cumulative discharge opening area of all the fluid discharge openings 30 located in the inner-intermediate annular region can be within 25, within 10, within 5, or within 1 percent of the cumulative discharge opening area of all the fluid discharge openings 30 located in the outer-intermediate annular region. It should be understood that, if the boundary of a theoretical annular region bisects a fluid discharge opening 30, then each portion of the bisected fluid discharge opening 30 will count only toward the cumulative discharge opening area of the respective annular region in which that portion lies.

In various embodiments, the fluid discharge openings 30 can be circular or substantially circular. Additionally, the fluid discharge openings 30 can have an average mean diameter in the range of from about 0.5 to about 2.0 mm, in the range of from about 0.6 to about 1.8 mm, in the range of from about 0.7 to about 1.6 mm, or in the range of from 0.8 to 1.4 mm. Furthermore, in various embodiments, the fluid discharge openings 30 can all be substantially the same size, having a variation in the mean diameter of less than 0.5 mm, less than 0.3 mm, less than 0.1 mm, or less than 0.05 mm between any two of the fluid discharge openings 30.

In various embodiments, at least a portion of the fluid discharge openings 30 can be positioned so as to be able to discharge a fluid in a normally downward direction. As used herein, the term "downward" shall denote any direction extending below the normally underneath side of the sparger 10 within 15° of vertical. In one or more embodiments, at least 50, at least 75, at least 90, or at least 95 percent of the fluid discharge openings 30 are positioned so as to be able to discharge a fluid in a normally downward direction. Furthermore, all or substantially all of the fluid discharge openings 30 can be configured to discharge a fluid in a normally downward direction.

In one or more embodiments, the sparger 10 can have a total flow-through open area of at least 25 percent, at least 50 percent, or at least 75 percent. As used herein, the term "flow-through open area" shall denote the total horizontal area occupied by a sparger defined by a theoretical perimeter of its outermost points minus the percentage of area occupied by the fluid distribution conduits of the sparger. For instance, with respect to the sparger 10, the total horizontal space occupied by the sparger 10 would be defined by the outermost ends of the fluid distribution conduits 28, while the total flow-through open area would be the sum of the wedge-shaped open areas 40 between fluid distribution conduits 28. The wedge-shaped open areas 40 are measured on a theoretical horizontal plane passing through the sparger 10 at an elevation where the fluid distribution conduits 28 have their maximum horizontal diameters. In various embodiments, the sparger 10 can have a total flow-through open area in the range of from about 25 to about 99 percent, in the range of from about 50 to about 95 percent, or in the range of from 75 to 90 percent.

The sparger 10 can have any dimensions suited for use in a bubble column reactor. In one or more embodiments, the sparger 10 can have a maximum diameter of at least 0.5 meters, at least 0.75 meters, or at least 1 meter. Furthermore, the sparger 10 can have a maximum diameter in the range of from about 0.5 to about 6 meters, in the range of from about 0.75 to about 5 meters, or in the range of from 1 to 4 meters. Also, when the sparger 10 is disposed in the reaction zone of a bubble column reactor, such as the reaction zone 24 of the bubble column reactor 12 depicted in FIG. 1, the sparger 10 can have a maximum diameter that is at least at least 90 percent, at least 95 percent, at least 96 percent, or at least 97 percent of the diameter of the reaction zone at the elevation of the reaction zone 24 where the sparger 10 is disposed. The elevation of the sparger 10 relative to the reaction zone shall be determined using to the centroid of the sparger 10. The centroid of the sparger 10 shall be determined on the basis of the sparger alone and shall not be calculated including other members, such as the vertical member 32.

Referring again to FIG. 1, as noted above, the bubble column reactor 12 can be configured to facilitate countercurrent contact between a slurry (e.g., a purified terephthalic acid ("PTA") slurry) and a gas-phase stream (e.g., a gas-phase oxidant). Accordingly, in various embodiments, the slurry inlet 18 of the bubble column reactor 12 can be located so as to introduce a slurry within the normally-uppermost 50 percent, the normally-uppermost 30 percent, the normally-uppermost 20 percent, or the normally-uppermost 10 percent region of the reaction zone 24 of the bubble column reactor 12. Additionally, in various embodiments, the sparger 10 can be disposed within the normally-lowermost 30 percent, the normally-lowermost 20 percent, or the normally-lowermost 10 percent region of the reaction zone 24 of the bubble column reactor 12.

In various embodiments, the sparger 10 can be configured to introduce a gas, such as a gas-phase oxidant (e.g., air or a combination of air and steam), into the reaction zone 24. In various embodiments, the gas flow rate to the sparger 10 can be at least 25, at least 50, at least 75, at least 100, or at least 150 kg/hour. Furthermore, the gas flow rate to the sparger 10 can be in the range of from about 25 to about 700 kg/hour, in the range of from about 50 to about 600 kg/hour, or in the range of from 75 to 500 kg/hour. Additionally, a gas can be introduced into the reaction zone 24 at such a rate as to produce a superficial gas velocity ("$U_g$") in the reaction zone 24 in the range of from about 0.01 to about 0.9 cm/s, in the range of from about 0.05 to about 0.4 cm/s, or in the range of from 0.1 to 0.2 cm/s. Superficial gas velocity, as known in the art, is simply the ratio of volumetric gas flow rate to the average cross-sectional area of the reaction zone 24. In various embodiments, the superficial gas velocity in the reaction zone 24 can be about 0.16 cm/s. Moreover, the gas holdup in the reaction zone 24 can be in the range of from about 0.5 to about 3 percent, or in the range of from 1 to 2 percent. As known in the art, "gas holdup" is simply the volume fraction of a multi-phase reaction medium that is in the gaseous state. Also, in various embodiments, the pressure drop associated with introducing the gas-phase stream into the reaction zone 24 can be at least 1, at least 2, or at least 2.5 pounds per square inch ("psi"). Furthermore, the pressure drop associated with introducing the gas-phase stream into the reaction zone 24 can be in the range of from about 1 to about 10 psi, in the range of from about 2 to about 7.5 psi, or in the range of from 2.5 to 5 psi. Pressure drop is determined according to the following formula:

$$\Delta P = 0.36(\rho)(U_0^2)$$

where $\Delta P$ is the pressure drop, $\rho$ is the gas density of the incoming gas-phase stream, and $U_0$ is the velocity of the gas-phase stream determined at the fluid discharge openings 30. $U_0$ is determined according to the following formula:

$$U_0 = [\text{flow rate of gas-phase stream}]/[N(\pi/4)(d_0^2)]$$

where N is the total number of the fluid discharge openings 30 and $d_0$ is the average diameter of the fluid discharge openings 30.

In various embodiments, the operating pressure of the reaction zone 24, measured at the off-gas outlet 22, can be in the range of from about 0.4 to about 8 MPa, in the range of from about 0.5 to about 4 MPa, or in the range of from 1 to 2 MPa. Additionally, the operating temperature of the reaction zone 24, measured at the slurry outlet 26, can be in the range of from about 150 to about 280° C., in the range of from about 160 to about 240° C., or in the range of from 170 to 210° C.

Figure 3:
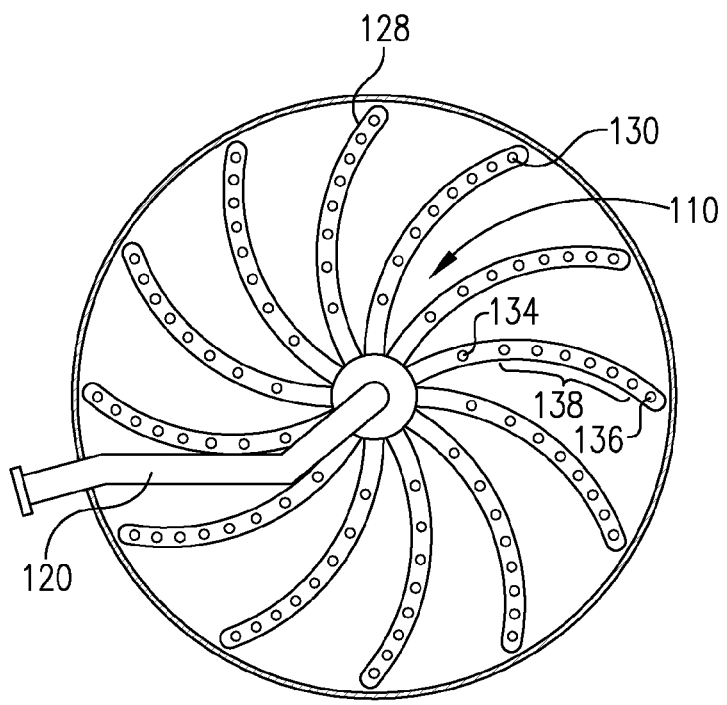
FIG. 3 is a bottom view of an alternate sparger suitable for use in the reactor depicted in FIG. 1, particularly illustrating a sparger having curved radially-extending fluid distribution conduits for introducing a fluid into the reaction zone of the reactor.

Referring now to FIG. 3, an alternate sparger 110 is depicted having a plurality of curved, radially-extending fluid distribution conduits 128. Each of the fluid distribution conduits 128 can comprise a plurality of fluid discharge openings 130, which include innermost fluid discharge openings 134, intermediate fluid discharge openings 138, and outermost fluid discharge openings 136. Additionally, the sparger 110 comprises a gas entry conduit 120. In various embodiments, the sparger 110 can be employed in a bubble column reactor (such as bubble column reactor 12, described above with reference to FIG. 1) to introduce a gas (e.g., a gas-phase oxidant) into the reaction zone of the reactor. The sparger 110, the fluid distribution conduits 128, and the fluid discharge openings 130 can each have the same or substantially the same dimensions and can operate in the same or substantially the same manner as the sparger 10, the fluid distribution conduits 28, and the fluid discharge openings 30 described above with reference to FIGS. 1 and 2.

Figure 4:
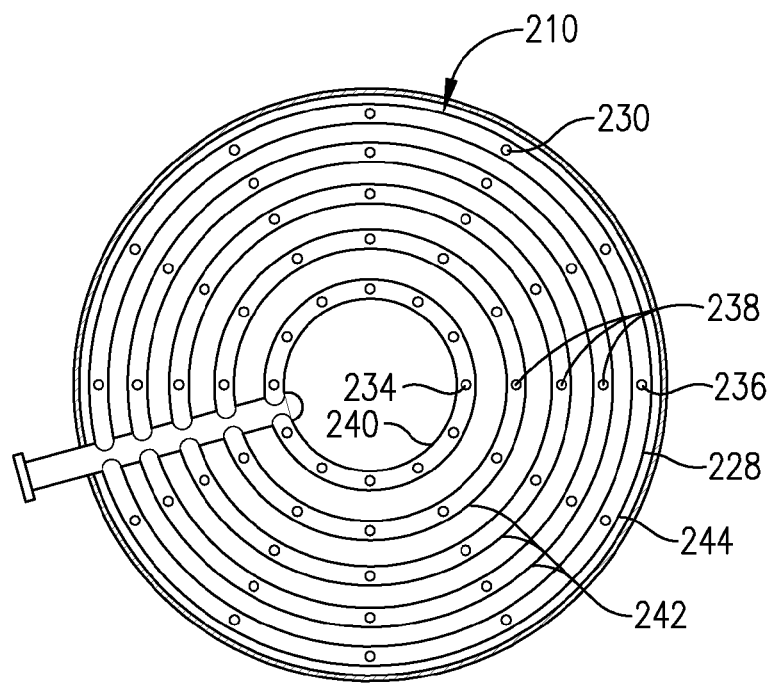
FIG. 4 is a bottom view of an alternate sparger suitable for use in the reactor depicted in FIG. 1, particularly illustrating a sparger having circular fluid distribution conduits for introducing a fluid into the reaction zone of the reactor.

Referring now to FIG. 4, an alternate sparger 210 is depicted having a plurality of circular fluid distribution conduits 228. The circular fluid distribution conduits 228 can be positioned in a concentric or substantially concentric manner. Additionally, in various embodiments, the circular fluid distribution conduits 228 can be spaced equiannularly or substantially equiannularly. As can be seen in FIG. 4, the fluid distribution conduits 228 present a plurality of fluid discharge openings 230. The innermost fluid discharge openings 234 can be located on the innermost fluid distribution conduit 240, the intermediate fluid discharge openings 238 can be located on their respective intermediate fluid distribution conduits 242, and the outermost fluid discharge openings 236 can be located on the outermost fluid distribution conduit 244. The number, spacing, and dimensions of the fluid discharge openings 230 can be the same or substantially the same as the fluid discharge openings 30 described above with respect to FIG. 2. Additionally, the sparger 210 can operate in the same or substantially the same manner as the sparger 10 described above with respect to FIGS. 1 and 2.

Figure 5:
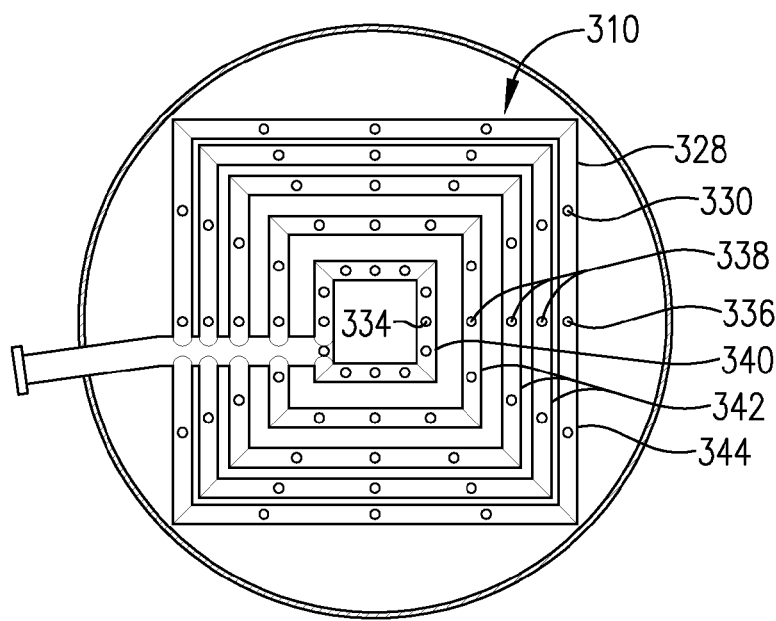
FIG. 5 is a bottom view of an alternate sparger suitable for use in the reactor depicted in FIG. 1, particularly illustrating a sparger having square fluid distribution conduits for introducing a fluid into the reaction zone of the reactor.

Referring now to FIG. 5, an alternate sparger 310 is depicted having a plurality of square fluid distribution conduits 328. The square fluid distribution conduits 328 can be positioned in a concentric or substantially concentric manner. As can be seen in FIG. 5, the fluid distribution conduits 328 present a plurality of fluid discharge openings 330. In various embodiments, the square fluid distribution conduits 328 can be spaced such that the fluid discharge openings 330 are equiannularly or substantially equiannularly spaced. In one or more embodiments, the innermost fluid discharge openings 334 can be located on the innermost fluid distribution conduit 340, the intermediate fluid discharge openings 338 can be located on their respective intermediate fluid distribution conduits 342, and the outermost fluid discharge openings 336 can be located on the outermost fluid distribution conduit 344. The number, spacing, and dimensions of the fluid discharge openings 330 can be the same or substantially the same as the fluid discharge openings 30 described above with respect to FIG. 2. Additionally, the sparger 310 can operate in the same or substantially the same manner as the sparger 10 described above with respect to FIGS. 1 and 2.

Figures 6, 7:
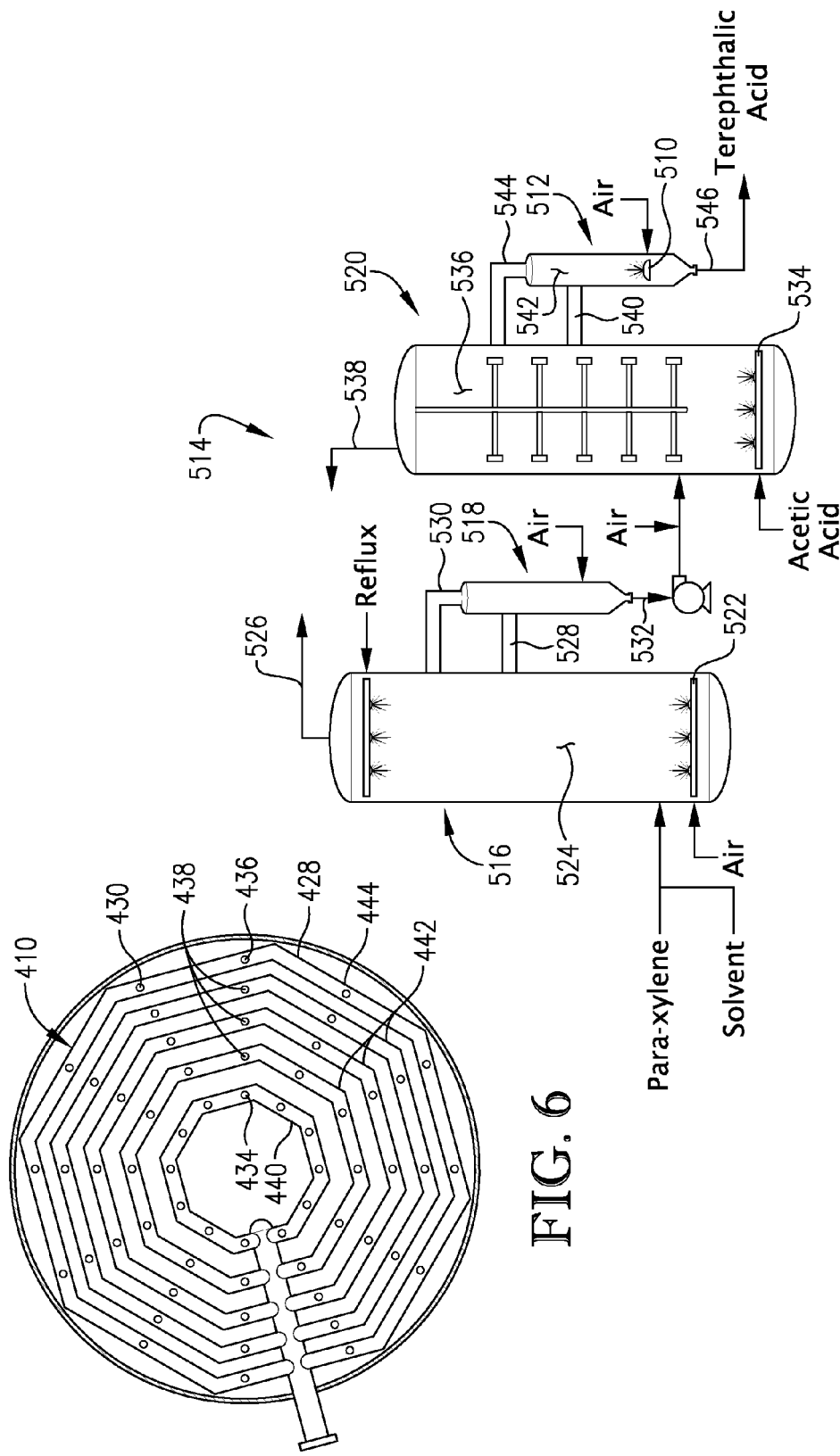
FIG. 6 is a bottom view of an alternate sparger suitable for use in the reactor depicted in FIG. 1, particularly illustrating a sparger having octagonal fluid distribution conduits for introducing a fluid into the reaction zone of the reactor.
FIG. 7 is a schematic view of a system for oxidizing an oxidizable compound, particularly illustrating a primary oxidation reactor, a primary oxidation side-draw reactor, a secondary oxidation reactor, and a secondary oxidation side-draw reactor having a sparger disposed therein.

Referring now to FIG. 6, an alternate sparger 410 is depicted having a plurality of octagonal fluid distribution conduits 428. The octagonal fluid distribution conduits 428 can be positioned in a concentric or substantially concentric manner. As can be seen in FIG. 6, the fluid distribution conduits 428 present a plurality of fluid discharge openings 430. In various embodiments, the octagonal fluid distribution conduits 428 can be spaced such that the fluid discharge openings 430 are equiannularly or substantially equiannularly spaced. In one or more embodiments, the innermost fluid discharge openings 434 can be located on the innermost fluid distribution conduit 440, the intermediate fluid discharge openings 438 can be located on their respective intermediate fluid distribution conduits 442, and the outermost fluid discharge openings 436 can be located on the outermost fluid distribution conduit 444. The number, spacing, and dimensions of the fluid discharge openings 430 can be the same or substantially the same as the fluid discharge openings 30 described above with respect to FIG. 2. Additionally, the sparger 410 can operate in the same or substantially the same manner as the sparger 10 described above with respect to FIGS. 1 and 2.

Referring now to FIG. 7, a sparger 510 can be employed in a bubble column reactor 512 in a system 514 for at least partially oxidizing an oxidizable compound (e.g., para-xylene) to form a dicarboxylic acid (e.g., terephthalic acid). The system 514 is depicted as comprising an initial oxidation reactor 516, an initial oxidation side-draw reactor 518, a secondary oxidation reactor 520, and the bubble column reactor 512, which can be a side-draw reactor. The sparger 510 can have the same or substantially the same dimensions and operate in the same or substantially the same manner as described above with reference to any of the spargers 10, 110, 210, 310, or 410 described above with reference to FIGS. 2, 3, 4, 5, and 6, respectively. Additionally, the bubble column reactor 512 can have the same or substantially the same dimensions and operate in the same or substantially the same manner as the bubble column reactor 12 described above with reference to FIG. 1.

In operation, a liquid-phase feed stream comprising an oxidizable compound (e.g., para-xylene) and a solvent (e.g., acetic acid and/or water) can be introduced into the initial oxidation reactor 516 for liquid-phase oxidation. A gas-phase oxidant (e.g., air) can also be introduced into the initial oxidation reactor 516 via a sparger 522. In one or more embodiments, the initial oxidation reactor 516 can be a bubble column reactor, so that agitation of the resulting reaction medium in the reaction zone 524 of the initial oxidation reactor 516 is primarily provided by bubbles of the incoming gas-phase oxidant. Oxidation of the oxidizable compound can be a precipitation reaction producing a three-phase reaction medium. Following initial oxidation, the resulting off-gas can be discharged via a line 526, and the resulting crude dicarboxylic acid slurry (e.g., a crude terephthalic acid ("CTA") slurry) can be withdrawn via a side-draw conduit 528.

The slurry in the side-draw conduit 528 can be introduced into the initial oxidation side-draw reactor 518 where it can undergo further oxidation via contact with additional gas-phase oxidant (e.g., air or a combination of air and steam). The off-gas resulting from further oxidation in the initial oxidation side-draw reactor 518 can be withdrawn via a line 530, while the resulting slurry can be withdrawn via a line 532.

The slurry from the line 532 can be introduced into the secondary oxidation reactor 520. Additionally, additional gas-phase oxidant (e.g., air) can be mixed with the slurry from the line 532 prior to introduction into the secondary oxidation reactor 520. Alternatively, additional gas-phase oxidant (e.g., air) can be introduced into the secondary oxidation reactor 520 separately. Additional solvent (e.g., acetic acid and/or water) can be introduced into the secondary oxidation reactor 520 via a sparger 534. In one or more embodiments, the secondary oxidation reactor 520 can be a continuous stirred tank reactor ("CSTR"), so that agitation of the resulting reaction medium in the reaction zone 536 of the secondary oxidation reactor 520 is primarily provided by mechanical means. In alternate embodiments, the secondary oxidation reactor 520 can be a bubble column reactor. Following secondary oxidation, the resulting off-gas can be discharged via a line 538, and the resulting purified dicarboxylic acid slurry (e.g., a purified terephthalic acid ("PTA") slurry) can be withdrawn via a side-draw conduit 540.

The slurry in the side-draw conduit 540 can be introduced into the bubble column reactor 512 where it can undergo further oxidation via contact with additional gas-phase oxidant (e.g., air). As noted above, the additional gas-phase oxidant can be introduced into the reaction zone 542 of the bubble column reactor 512 via the sparger 510, which can have the same configuration as any of the above-described spargers of FIGS. 2-6. The off-gas resulting from the additional oxidation in the bubble column reactor 512 can be withdrawn via a line 544, while the resulting slurry (e.g., a terephthalic acid slurry) can be withdrawn via a line 546.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A system for at least partially oxidizing an oxidizable compound by contacting at least a portion of said oxidizable compound with a gas-phase oxidant in a reaction medium, said system comprising:
   a first oxidation reactor;
   a second oxidation reactor in downstream fluid-flow communication with said first oxidation reactor;
   a bubble column actor in downstream fluid-flow communication with said second oxidation reactor and defining a reaction zone; and
   a sparger disposed within said reaction zone and configured to discharge at least a portion of said gas-phase oxidant into said reaction zone,
   wherein said sparger comprises one or more fluid distribution conduits defining a plurality of fluid discharge openings, wherein said sparger is disposed within the normally-lowermost 30 percent region of said reaction zone;
   an outlet for a reaction medium, wherein the outlet for the reaction medium is located at or near a normally bottom portion of the bubble column reactor, below the sparger;
   a gas outlet at or near a normally top portion of the bubble column reactor;
   wherein said bubble column reactor is configured to receive the reaction medium in the form of a slurry from said second oxidation reactor within the normally-uppermost 50 percent region of said reaction zone and at a position below a surface of the reaction medium;
   wherein when said sparger is theoretically partitioned into four annular regions of equal area, the cumulative discharge opening area of the fluid discharge openings located in one of said annular regions is within 25 percent of the cumulative discharge opening area of the fluid discharge openings located in at least one other of said annular regions,
   wherein said sparger has a total flow-through open area of at least 25 percent;
   wherein said sparger has a maximum diameter that is at least 90 percent of the diameter of said reaction zone at the elevation where said sparger is disposed; and
   wherein said sparger is configured such that agitation of the reaction medium is provided primarily by upward movement of gas bubbles discharged from said at least three fluid discharge openings through said reaction medium, such that less than 5 percent of the agitation of the reaction medium is provided by mechanical agitation.

2. The system of claim 1, wherein said sparger comprises a plurality of fluid distribution conduits, wherein each of said fluid distribution conduits comprises at least three of said fluid discharge openings, wherein each of said fluid distribution conduits is fluidly coupled to a common fluid entry conduit.

3. The system of claim 2, wherein said sparger comprises at least three of said fluid distribution conduits, wherein said fluid distribution conduits extend radially from said common fluid entry conduit, wherein the radial spacing of said fluid discharge openings associated with each of said fluid distribution conduits decreases outwardly from said common fluid entry conduit.

4. The system of claim 1, wherein said fluid discharge openings have an average mean diameter in the range of from about 0.5 to about 2.0 mm, wherein greater than 50 percent of said fluid discharge openings are positioned to discharge said gas-phase oxidant in a normally downward direction, wherein said sparger has a maximum diameter of at least 95 percent of the maximum diameter of said reaction zone, wherein the deviation in the mean diameter among all of said fluid discharge openings is less than 0.5 mm.

5. The system of claim 1, wherein the cumulative discharge opening area of the fluid discharge openings located in one of said annular regions is within 25 percent of each of the cumulative discharge opening areas of the fluid discharge openings respectively located in at least two others of said annular regions.

6. The system of claim 1, wherein the sparger is connected to an oxidizer gas supply.

7. The system according to claim 1, wherein the sparger of the bubble column reactor in fluid-flow communication with the second oxidation reactor comprises at least three radially-extending fluid distribution conduits,
wherein each fluid distribution conduit defines at least three fluid discharge openings,
wherein the radial spacing of said fluid discharge openings associated with each of said fluid distribution conduits decreases outwardly, and
wherein greater than 50 percent of said fluid discharge openings are positioned to discharge said fluid in a normally downward direction.

8. The system of claim 7, wherein each of said fluid distribution conduits of the sparger is fluidly coupled to and extends outwardly from a common fluid entry conduit.

9. The system of claim 8, wherein said fluid distribution conduits are spaced substantially equally around said common fluid entry conduit.

10. The system of claim 7, wherein each of said fluid distribution conduits of the sparger comprises at least four of said fluid discharge openings.

11. The system of claim 7, wherein said fluid discharge openings of the sparger are spaced substantially equiannularly.

12. The system of claim 7, wherein said sparger has a total number of said fluid discharge openings in the range of from 20 to 300.

13. The system of claim 7, wherein said fluid discharge openings of the sparger have an average mean diameter in the range of from about 0.5 to about 2.0 mm.

14. The system of claim 7, wherein said sparger has a maximum diameter in the range of from about 0.5 to about 6 meters, wherein said sparger has a maximum diameter that is at least 95 percent of the diameter of said reaction zone at the elevation where said sparger is disposed.

15. The system of claim 7, wherein the deviation in the mean diameter among all of said fluid discharge openings is less than 0.5 mm.

* * * * *